(12) United States Patent
Moriya

(10) Patent No.: US 11,044,424 B2
(45) Date of Patent: Jun. 22, 2021

(54) IMAGE PROCESSING DEVICE

(71) Applicants: Kabushiki Kaisha Toshiba, Tokyo (JP); Toshiba Electronic Devices & Storage Corporation, Tokyo (JP)

(72) Inventor: Akira Moriya, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/811,434

(22) Filed: Mar. 6, 2020

(65) Prior Publication Data

US 2021/0084242 A1   Mar. 18, 2021

(30) Foreign Application Priority Data

Sep. 17, 2019  (JP) .............................. JP2019-168847

(51) Int. Cl.
*H04N 5/351* (2011.01)
*H04N 5/345* (2011.01)
*H04N 5/341* (2011.01)
*H04N 5/378* (2011.01)

(52) U.S. Cl.
CPC ........... *H04N 5/341* (2013.01); *H04N 5/3456* (2013.01); *H04N 5/351* (2013.01); *H04N 5/378* (2013.01)

(58) Field of Classification Search
CPC ...... H04N 5/341; H04N 5/345; H04N 5/3456; H04N 5/351; H04N 5/378; G06T 1/60
See application file for complete search history.

(56) References Cited

U.S. PATENT DOCUMENTS 9,118,848 B2 *  8/2015  Ishikawa ............ H04N 1/32358
2019/0007678 A1 *  1/2019  Perez-Ramirez .... H04N 19/109

FOREIGN PATENT DOCUMENTS

| JP | 2001-197479 A | 7/2001 |
| JP | 2006-107060 A | 4/2006 |
| JP | 6266946 B2 | 1/2018 |

* cited by examiner

*Primary Examiner* — Daniel M Pasiewicz

(74) *Attorney, Agent, or Firm* — White & Case LLP

(57) ABSTRACT

An image processing device is used in combination with a camera configured to acquire pixel data including a two-dimensional address value indicating a pixel position and a luminance change amount for each pixel of which a change in luminance is detected by scanning a plurality of pixels in a predetermined scanning order, and includes an address value acquisition unit, a scanning distance calculation unit, and a binary data generation unit. The address value acquisition unit converts the two-dimensional address value to acquire a one-dimensional address value. The scanning distance calculation unit calculates a scanning distance from a first pixel to a second pixel based on the one-dimensional address value. The binary data generation unit generates binary data including bit strings that have different number of bits according to a calculation result of the scanning distance and a bit string indicating the luminance change amount.

8 Claims, 8 Drawing Sheets

FIG. 4

| COORDINATE VALUES (X, Y) | RASTER ADDRESS VALUE RA | SCANNING DISTANCE DA | |
|---|---|---|---|
| (0, 0) | 0 | (1) | ⎫ |
| (5, 10) | 19205 | 19205 | |
| (1900, 35) | 69100 | 49895 | ⎬ F1 |
| (1901, 35) | 69101 | 1 | |
| (500, 100) | 192500 | 123399 | |
| (1800, 900) | 1729800 | 1537300 | ⎭ |
| (1800, 900) | 1729800 | (1729801) | ⎫ F2 |
| (1100, 1026) | 1971020 | 241200 | ⎭ |
| (0, 0) | 0 | (1) | ⎫ |
| (3, 1079) | 2071683 | 2071683 | ⎬ F3 |
| (4, 1079) | 2071684 | 1 | ⎭ |

IMAGE PROCESSING DEVICE

CROSS REFERENCE TO RELATED APPLICATION

This application is based upon and claims the benefit of priority from the prior Japanese Patent Application No. 2019-168847 filed on Sep. 17, 2019; the entire contents of which are incorporated herein by reference.

BACKGROUND OF INVENTION

1. Field of the Invention

Embodiments described herein relate generally to an image processing device.

2. Description of the Related Art

In recent years, as techniques that can be used for motion detection of an object, for example, techniques related to an event camera (event-based camera) have been proposed, the event camera being configured not to output data of a pixel group corresponding to a region where no change in luminance occurs in the object while outputting data indicating a change in luminance of each pixel corresponding to a region where a change in luminance occurs in the object.

The above-described event camera has an advantage that data obtained according to the motion of the object can be output at a higher speed compared with a camera of the related art, but has a problem that the data transfer amount may increase according to a motion size of the object when the data is transferred to a main memory such as a DRAM.

BRIEF DESCRIPTION OF THE DRAWINGS

FIG. 4 is a diagram illustrating examples of raster address values and scanning distances obtained through the process performed in the image processing device according to the embodiment;

DETAILED DESCRIPTION

An embodiment provides an image processing device capable of reducing a data transfer amount when data obtained by an event camera is transferred to a main memory.

According to the embodiment, the image processing device is used in combination with a camera configured to acquire pixel data including a luminance change amount and a two-dimensional address value indicating a pixel position on a sensor surface for each pixel of which a change in luminance in an object is detected by scanning a plurality of pixels disposed in a lattice form on the sensor surface of an image sensor in a predetermined scanning order. The image processing device includes an address value acquisition unit, a scanning distance calculation unit, and a binary data generation unit. The address value acquisition unit acquires a one-dimensional address value by applying a predetermined conversion process set based on the predetermined scanning order and the number of pixels on the sensor surface to the two-dimensional address value included in the pixel data. The scanning distance calculation unit calculates a scanning distance from a first pixel in which a change in luminance is detected at a first timing among the plurality of pixels to a second pixel in which a change in luminance is detected at a second timing later than the first timing based on the one-dimensional address value acquired by the address value acquisition unit. The binary data generation unit generates and outputs binary data including bit strings that have different numbers of bits in accordance with a calculation result of the scanning distance by the scanning distance calculation unit and a bit string indicating the luminance change amount.

Hereinafter, embodiments will be described with reference to the drawings.

FIGS. 1 to 8 relate to the embodiments.

Figure 1:
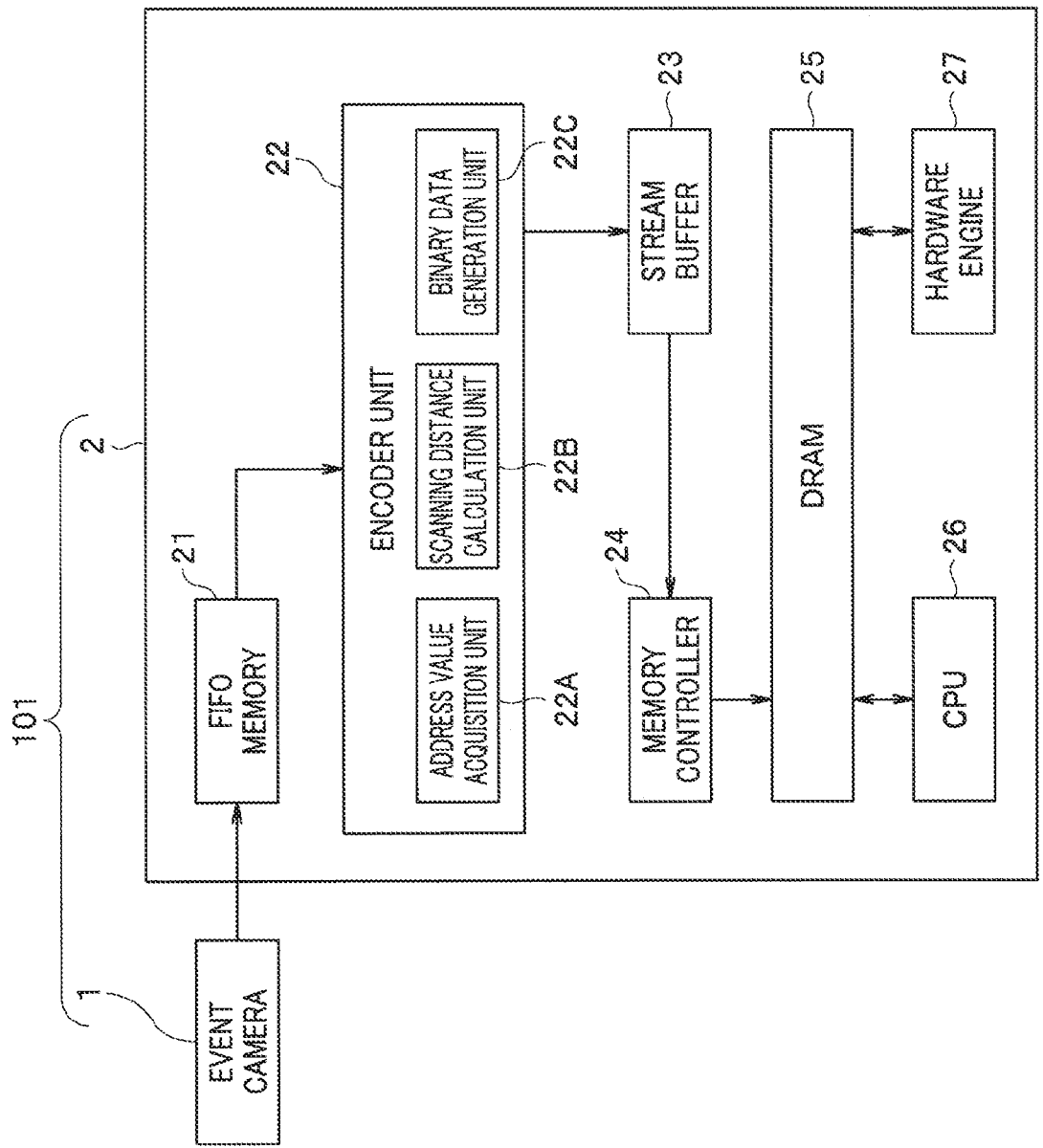
FIG. 1 is a diagram illustrating an example of a configuration of an image processing system including an image processing device according to an embodiment.

An image processing system 101 includes, for example, an event camera 1 and an image processing device 2, as illustrated in FIG. 1. FIG. 1 is a diagram illustrating an example of a configuration of an image processing system including an image processing device according to an embodiment.

The event camera 1 includes an image sensor (not illustrated) in which a plurality of pixels are disposed in a lattice form on a sensor surface.

For example, the event camera 1 detects a change in luminance for each pixel corresponding to a region in which a change in luminance occurs in an object by scanning each pixel disposed on the sensor surface of the image sensor in a raster scanning order (an order from left to right and an order from top to bottom) and acquires pixel data indicating the detected change in the luminance for each pixel. The event camera 1 sequentially outputs the pixel data acquired in the above-described manner to the image processing device 2. The event camera 1 does not acquire pixel data (output the pixel data to the image processing device 2) of a pixel group (a pixel group in which no change in luminance of each pixel included in the image sensor is detected) corresponding to a region in which no change in luminance occurs in the object.

More specifically, for example, as pixel data of one pixel in which a change in luminance of each pixel included in the image sensor is detected, the event camera 1 acquires data including a coordinate value X equivalent to information indicating a position of the one pixel in a horizontal direction of the sensor surface of the image sensor, a coordinate value Y equivalent to information indicating the position of the one pixel in a vertical direction of the sensor surface, a time t equivalent to information with which a detection timing of the change in luminance in the one pixel can be specified, and a luminance change amount $\Delta L$ equivalent to information indicating magnitude of the change in luminance occurring in the one pixel.

In other words, the event camera 1 acquires pixel data including the coordinate values (X and Y) equivalent to a two-dimensional address value indicating a pixel position on the sensor surface and the luminance change amount ΔL for each pixel in which a change in luminance in an object is detected by scanning a plurality of pixels disposed in a lattice form on the sensor surface of the image sensor in a predetermined scanning order (raster scanning order).

As illustrated in FIG. 1, for example, the image processing device 2 includes a first in first out (FIFO) memory 21, an encoder unit 22, a stream buffer 23, a memory controller 24, a DRAM 25, a CPU 26, and a hardware engine 27.

The FIFO memory 21 can record the pixel data output sequentially from the event camera 1 in a time sequence and until a predetermined number of data. The FIFO memory 21 performs an operation of recording latest pixel data output from the event camera 1 and also performs an operation of outputting the oldest pixel data in a pixel data group of the predetermined number of data recorded in a time sequence to the encoder unit 22.

The encoder unit 22 includes, for example, an encoder circuit. The encoder unit 22 performs an encoding process on each of the pixel data output sequentially from the FIFO memory 21 based on the number of pixels or the like of the image sensor provided in the event camera 1 and sequentially outputs binary data obtained as a processing result of the encoding process to the stream buffer 23. The encoder unit 22 includes a function serving as an address value acquisition unit 22A, a function serving as a scanning distance calculation unit 22B, and a function serving as a binary data generation unit 22C. Note that a specific example of the encoding process performed by the encoder unit 22 and each function of the encoder unit 22 will be described later. In the embodiment, each function of the encoder unit 22 may be realized, for example, by executing a program read from a storage medium such as a memory (not illustrated).

Figure 2:
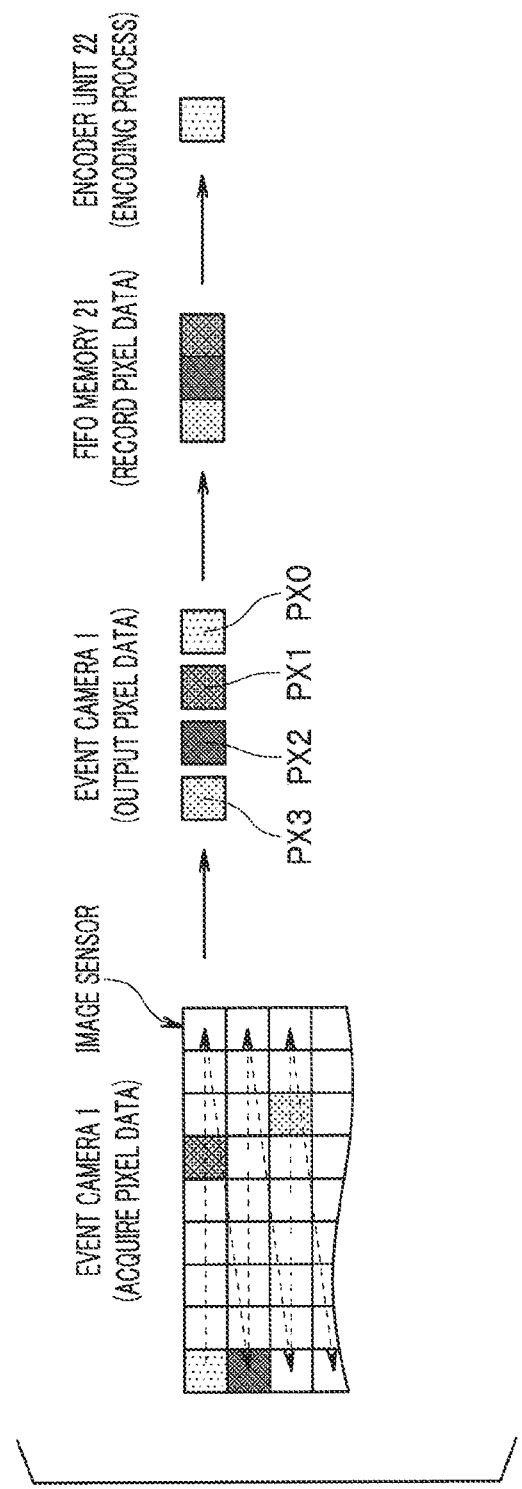
FIG. 2 is a diagram schematically illustrating a flow of pixel data in the image processing system according to the embodiment.

In the above-described configuration, for example, four pieces of pixel data, pixel data PX0, pixel data PX1, pixel data PX2, and pixel data PX3, are acquired and output in this order. When the FIFO memory 21 has a capacity in which three pieces of pixel data can be recorded, a flow of the four pieces of pixel data is illustrated as in FIG. 2. FIG. 2 is a diagram schematically illustrating the flow of the pixel data in the image processing system according to the embodiment.

The pixel data PX0 is converted into binary data through an encoding process of the encoder unit 22 after the pixel data PX3 is output to the encoder unit 22 at a timing at which the pixel data PX3 is recorded in the FIFO memory 21. The pixel data PX1 is retained by the FIFO memory 21 for a period until pixel data PX4 subsequent to the pixel data PX3 is recorded. The pixel data PX2 is retained by the FIFO memory 21 for a period until pixel data PX5 subsequent to the pixel data PX4 is recorded. The pixel data PX3 is retained by the FIFO memory 21 for a period until pixel data PX6 subsequent to the pixel data PX5 is recorded.

The stream buffer 23 can temporarily store the binary data output sequentially from the encoder unit 22.

The memory controller 24 performs an operation of reading the binary data stored in the stream buffer 23 and sequentially writing the read binary data in the DRAM 25.

In the DRAM 25, the binary data according to the operation of the memory controller 24 is sequentially written. The DRAM 25 serves as a main memory capable of reading and writing data by the CPU 26 and the hardware engine 27.

The CPU 26 reads the binary data written in the DRAM 25 in the same order as an order in which the writing is performed in the DRAM 25. The CPU 26 acquires similar data to data included in the pixel data output from the FIFO memory 21 to the encoder unit 22 by performing a decoding process on the binary data read from the DRAM 25. In other words, the CPU 26 includes a function serving as a decoder unit that acquires the pixel data by performing a decoding process on the binary data read from the DRAM 25. Note that a specific example of the decoding process performed by the CPU 26 will be described later. In the embodiment, a function of the CPU 26 may be realized, for example, by executing a program read from a storage medium such as a memory (not illustrated).

The CPU 26 performs an operation of detecting whether image data equivalent to one image (corresponding to one frame) including the same number of pixels as the number of pixels of the image sensor provided in the event camera 1 is stored in the DRAM 25.

When it is detected that no image data is stored in the DRAM 25, the CPU 26 performs an operation of generating new image data using the pixel data obtained by decoding the binary data read from the DRAM 25 and writing the generated new image data in the DRAM 25.

When it is detected that image data is stored in the DRAM 25, the CPU 26 generates updating image data by reading existing image data from the DRAM 25 and applying the luminance change amount ΔL included in the pixel data obtained by decoding the binary data read from the DRAM 25 to the existing image data. The CPU 26 performs an operation of writing the updating image data generated in the above-described way in the DRAM 25.

Note that, in the embodiment, instead of the CPU 26, a digital signal processor (DSP) that includes a similar function to the function of the CPU 26 may be provided in the image processing device 2.

Next, an operation and effect of the embodiment will be described.

The event camera 1 acquires pixel data PD0 corresponding to a pixel P0 in which a change in luminance is detected among the pixels included in the image sensor, for example, at a time t0 by scanning the pixels disposed on the sensor surface of the image sensor in the raster scanning order and outputs the acquired pixel data PD0 to the image processing device 2. The event camera 1 acquires pixel data PD1 corresponding to a pixel P1 in which a change in luminance is detected among the pixels included in the image sensor, for example, at a time t1 subsequent to the time t0 by scanning the pixels disposed on the sensor surface of the image sensor in the raster scanning order and outputs the acquired pixel data PD1 to the image processing device 2.

The FIFO memory 21 records the pixel data PD0 and the pixel data PD1 output from the event camera 1 in a time series. The FIFO memory 21 performs an operation of sequentially outputting the pixel data PD0 and the pixel data PD1 to the encoder unit 22 while performing the operation of sequentially recording the pixel data output from the event camera 1.

The encoder unit 22 performs an encoding process on the pixel data PD0 output from the FIFO memory 21 based on the number of pixels or the like of the image sensor provided in the event camera 1 and outputs binary data BD0 obtained as a processing result of the encoding process to the stream buffer 23. The encoder unit 22 performs an encoding process on the pixel data PD1 output from the FIFO memory 21 based on the number of pixels or the like of the image sensor provided in the event camera 1 and outputs binary data BD1 obtained as a processing result of the encoding process to the stream buffer 23.

Figure 3:
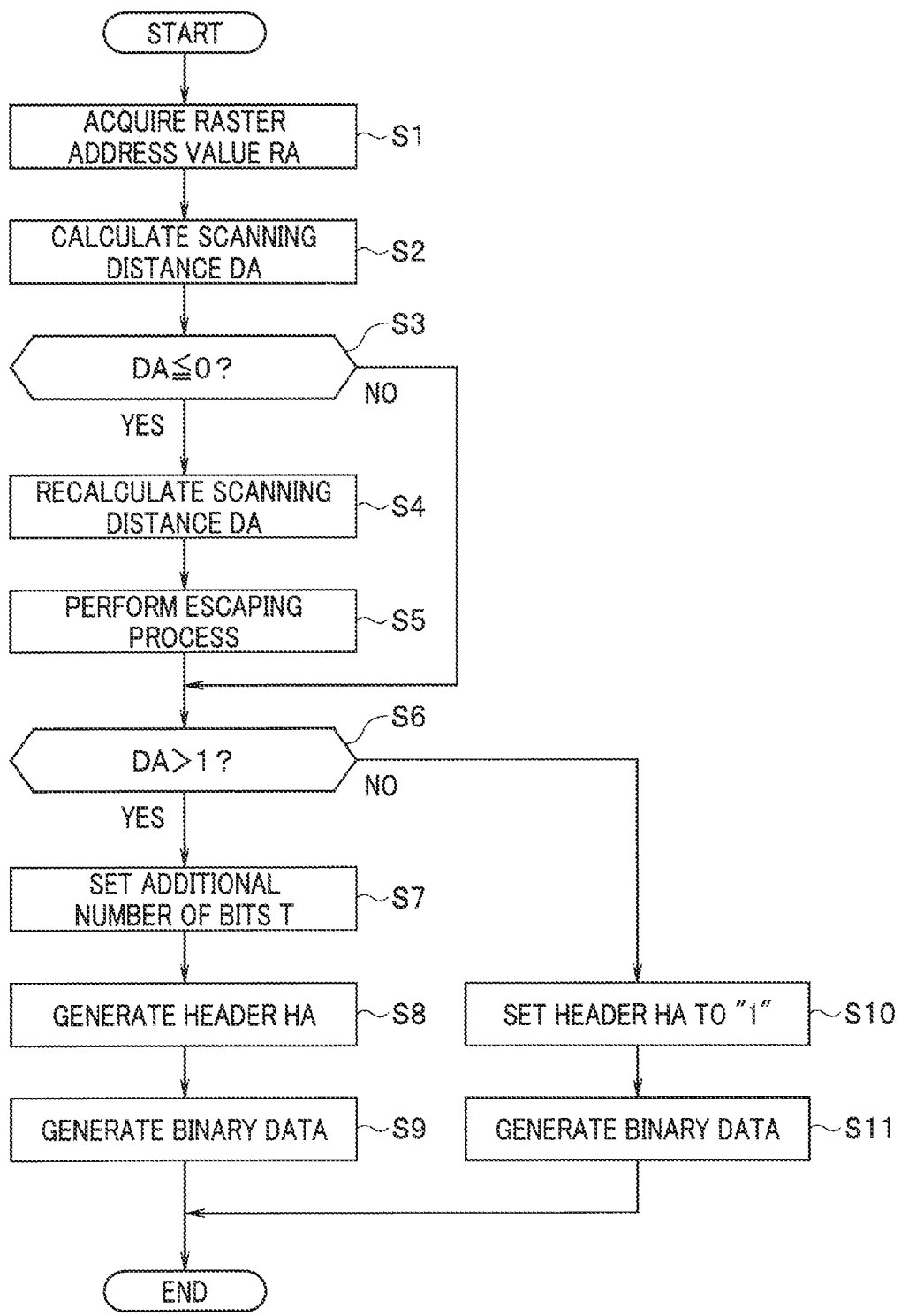
FIG. 3 is a flowchart illustrating a specific example of a process performed in the image processing device according to the embodiment.

Here, a specific example of a process performed by the encoder unit 22 according to the embodiment will be described with reference to FIG. 3. FIG. 3 is a flowchart illustrating a specific example of a process performed in the image processing device according to the embodiment.

Note that, hereinafter, the coordinate values X0 and Y0 of the pixel P0 and a luminance change amount ΔL0 in the pixel P0 are assumed to be included the pixel data PD0 in the description. Hereinafter, the coordinate values X1 and Y1 of the pixel P1 and a luminance change amount ΔL1 in the pixel P1 are assumed to be included the pixel data PD1 in the description. Hereinafter, a case in which the binary data BD1 corresponding to the pixel data PD1 is generated after the binary data BD0 corresponding to the pixel data PD0 is output to the stream buffer 23 will be described as an example. Hereinafter, the number of pixels PW in the horizontal direction of the sensor surface of the image sensor provided in the event camera 1 and the number of pixels PH in the vertical direction of the sensor surface are assumed to be existing values in the description. Hereinafter, the luminance change amount ΔL is assumed to be expressed as 8-bit (predetermined number of bits) binary digits in the description. Hereinafter, a time necessary to scan each pixel included in the image sensor of the event camera 1 once in the raster scanning order is referred to as one frame period.

The encoder unit 22 performs a process of acquiring a raster address value RA of the pixel in which the pixel data PD1 is acquired by applying the coordinate values X1 and Y1 included in the pixel data PD1 to Equation (1) below (step S1 of FIG. 3).

$$RA = Y1 \times PW + X1 \tag{1}$$

In Equation (1) above, a decimal value belonging to a range equal to or greater than 0 and equal to or less than (PW−1) is applied as the coordinate value X1.

In Equation (1) above, a decimal value belonging to a range equal to or greater than 0 and equal to or less than (PH−1) is applied as the coordinate value Y1. Therefore, the raster address value RA calculated using Equation (1) above belongs to a range equal to or greater than 0 and equal to or less than (PW−1)×(PH−1). The raster address value RA calculated using Equation (1) above is equivalent to a value allocated to each pixel disposed on the sensor surface of the image sensor in the event camera 1 in the raster scanning order and is equivalent to a one-dimensional value indicating a position of one pixel in which the pixel data PD is acquired.

In other words, the encoder unit 22 includes the function serving as the address value acquisition unit 22A and acquires the one-dimensional address value (the raster address value RA) by applying the predetermined conversion process (Equation (1) above) set based on the number of pixels PW and the raster scanning order to the coordinate values (X1, Y1) included in the pixel data PD1.

The encoder unit 22 retains the raster address value RA calculated through the process of step S1 of FIG. 3 until a raster address value in the pixel data output from the FIFO memory 21 after the pixel data PD1 is calculated.

The encoder unit 22 performs a process of calculating a scanning distance DA by applying the raster address value RA calculated through the process of step S1 of FIG. 3 to Equation (2) below (step S2 of FIG. 3). Note that PA in Equation (2) below indicates a raster address value obtained by applying Equation (1) above to the coordinate values X0 and Y0 included in the pixel data PD0.

$$DA = RA - PA \tag{2}$$

The scanning distance DA calculated using Equation (2) above indicates a distance when a section from a first pixel in which a change in luminance is detected at the first timing among the pixels included in the image sensor of the event camera 1 to a second pixel in which a change in luminance is detected at the second timing later than the first timing is traced by one pixel in the raster scanning order. Therefore, when the pixel data PD0 and the pixel data PD1 are acquired for different one frame periods, the scanning distance DA calculated using Equation (2) above can be set to a value equal to or less than 0.

In other words, the encoder unit 22 includes the function serving as the scanning distance calculation unit 22B and calculates the scanning distance DA from the pixel P0 in which a change in luminance is detected at the time t0 to the pixel P in which a change in luminance is detected at the time t1 subsequent to the time t0 based on the raster address values RA and PA.

The encoder unit 22 performs a determination process related to whether the scanning distance DA calculated through the process of step S2 of FIG. 3 is equal to or less than 0 (step S3 of FIG. 3).

When a determination result indicating that the scanning distance DA calculated through the process of step S2 of FIG. 3 is greater than 0 is obtained (NO in S3), the encoder unit 22 continues to perform a process of step S6 of FIG. 3 to be described below.

When a determination result indicating that the scanning distance DA calculated through the process of step S2 of FIG. 3 is equal to or less than 0 is obtained (YES in S3), the encoder unit 22 discards the scanning distance DA and performs a process of recalculating the scanning distance DA by applying the raster address value RA calculated through the process of step S1 of FIG. 3 to Equation (3) below (step S4 of FIG. 3).

$$DA = RA + 1 \tag{3}$$

After the encoder unit 22 performs the process of step S4 of FIG. 3, the encoder unit 22 further performs an escape process of generating an escape code that has a predetermined bit string and outputting the escape code to the stream buffer 23 (step S5 of FIG. 3).

Note that, hereinafter, a 9-bit bit string "100000000" in which a bit value "1" and 8 consecutive bit values "0" are arranged as the above-described escape code is assumed to be generated in the description.

The encoder unit 22 performs a determination process related to whether the scanning distance DA calculated through the process of step S2 or S4 of FIG. 3 is greater than 1 (step S6 of FIG. 3).

When a determination result indicating that the scanning distance DA calculated through the process of step S2 or S4 of FIG. 3 is greater than 1 (YES in S6), the encoder unit 22 continues to perform a process of step S7 of FIG. 3 to be described below. Conversely, when a determination result indicating that the scanning distance DA calculated through the process of step S2 or S4 of FIG. 3 is equal to or less than 1 (NO in S6), the encoder unit 22 continues to perform a process of step S10 of FIG. 3 to be described below.

Here, according to the embodiment, for example, when PW=1920 and PH=1080, the raster address value RA and the scanning distance DA illustrated in FIG. 4 are acquired according to coordinate values (X, Y) included in the pixel data output from the event camera 1. Note that, of the scanning distances DA in FIG. 4, unparenthesized scanning distances indicate values calculated through the process of step S2 of FIG. 3 and parenthesized scanning distances indicate values recalculated through the process of step S4 of FIG. 3. FIG. 4 is a diagram illustrating examples of raster address values and scanning distances obtained through the process performed in the image processing device according to the embodiment.

In the example illustrated in FIG. 4, the scanning distance DA is recalculated through the process of step S4 of FIG. 3 in pixel data acquired first for one frame period F1, pixel data acquired first for one frame period F2 subsequent to the one frame period F1, and pixel data acquired first for one frame period F3 subsequent to the one frame period F2.

The encoder unit 22 performs a process of setting an additional number of bits T added to N bits depending on whether the scanning distance DA can be expressed as N-bit binary digits (step S7 of FIG. 3). Note that, in the embodiment, for example, N=18 may be set.

More specifically, the encoder unit 22 sets the additional number of bits T to 0, for example, when the scanning distance DA is a value less than $2^N$. The encoder unit 22 sets a value obtained by subtracting the number of bits N from a minimum number of bits M satisfying a relation of $2^N \leq DA < 2^M$ as the additional number of bits T, for example, when the scanning distance DA is a value equal to or greater than $2^N$.

The encoder unit 22 performs a process of generating data of a header HA assigned to a head portion when binary data is generated in step S9 of FIG. 3 to be described below based on the additional number of bits T set through the process of step S7 of FIG. 3 (step S8 of FIG. 3).

More specifically, the encoder unit 22 generates a bit string in which consecutive T bit values "0" and a 2-bit bit string "01" are arranged in this order as the header HA. Therefore, for example, when T=0, the encoder unit 22 generates the 2-bit bit string "01" as the header HA. For example, when T=3, the encoder unit 22 generates a 5-bit bit string "00001" in which three consecutive bit values "0" and the 2-bit bit string "01" are arranged in this order as the header HA.

The encoder unit 22 performs a process of generating data in which a (T+2)-bit bit string indicating the header HA generated through the process of step S8 of FIG. 3, an (N+T)-bit bit string indicating the scanning distance DA, and an 8-bit bit string indicating the luminance change amount ΔL1 are arranged in this order as the binary data BD1 corresponding to the pixel data PD1 (step S9 of FIG. 3) and outputting the generated data to the stream buffer 23.

More specifically, for example, when N=18 and T=0, the encoder unit 22 generates the binary data BD1 in which a 2-bit bit string "01" indicating the header HA, an 18-bit bit string indicating the scanning distance DA, and an 8-bit bit string indicating the luminance change amount ΔL are arranged in this order and outputs the generated binary data BD1 to the stream buffer 23.

For example, when N=18 and T=3, the encoder unit 22 generates the binary data BD1 in which a 5-bit bit string "00001" indicating the header HA, a 21-bit bit string indicating the scanning distance DA, and an 8-bit bit string indicating the luminance change amount ΔL1 are arranged in this order and outputs the generated binary data BD1 to the stream buffer 23.

The encoder unit 22 performs a process of setting data (binary digit) of the header HA assigned to a head portion when the binary data is generated in step S11 of FIG. 3 to be described below to "1" (step S10 of FIG. 3).

The encoder unit 22 performs a process of generating data in which a bit value "1" indicating the header HA set through the process of step S10 of FIG. 3 and an 8-bit bit string indicating the luminance change amount ΔL1 are arranged in this order as the binary data BD1 corresponding to the pixel data PD1 (step S11 of FIG. 3) and outputting the generated data to the stream buffer 23.

In other words, in the processes of steps S6, S10, and S11 of FIG. 3, when raster address values adjacent to each other in two pieces of data of the pixel data PD0 and the pixel data PD1 are acquired, the binary data BD1 including no data indicating the scanning distance DA is output to the stream buffer 23. In the processes of steps S6 to S11 of FIG. 3, the encoder unit 22 includes the function serving as the binary data generation unit 22C, generates the binary data BD1 including the bit string that has different number of bits according to a calculation result of the scanning distance DA and a bit string indicating the luminance change amount ΔL1, and outputs the generated binary data BD1.

The memory controller 24 performs an operation of reading the binary data stored in the stream buffer 23 and sequentially writing the read binary data in the DRAM 25. Then, through the operation of the memory controller 24, the plurality of data including the binary data BD1 are sequentially written in the DRAM 25.

The CPU 26 reads the binary data written in the DRAM 25 in the same order as the order in which the data is written in the DRAM 25. The CPU 26 acquires similar data to the data included in the pixel data output from the FIFO memory 21 to the encoder unit 22 by performing the decoding process on the binary data read from the DRAM 25.

Figure 5:
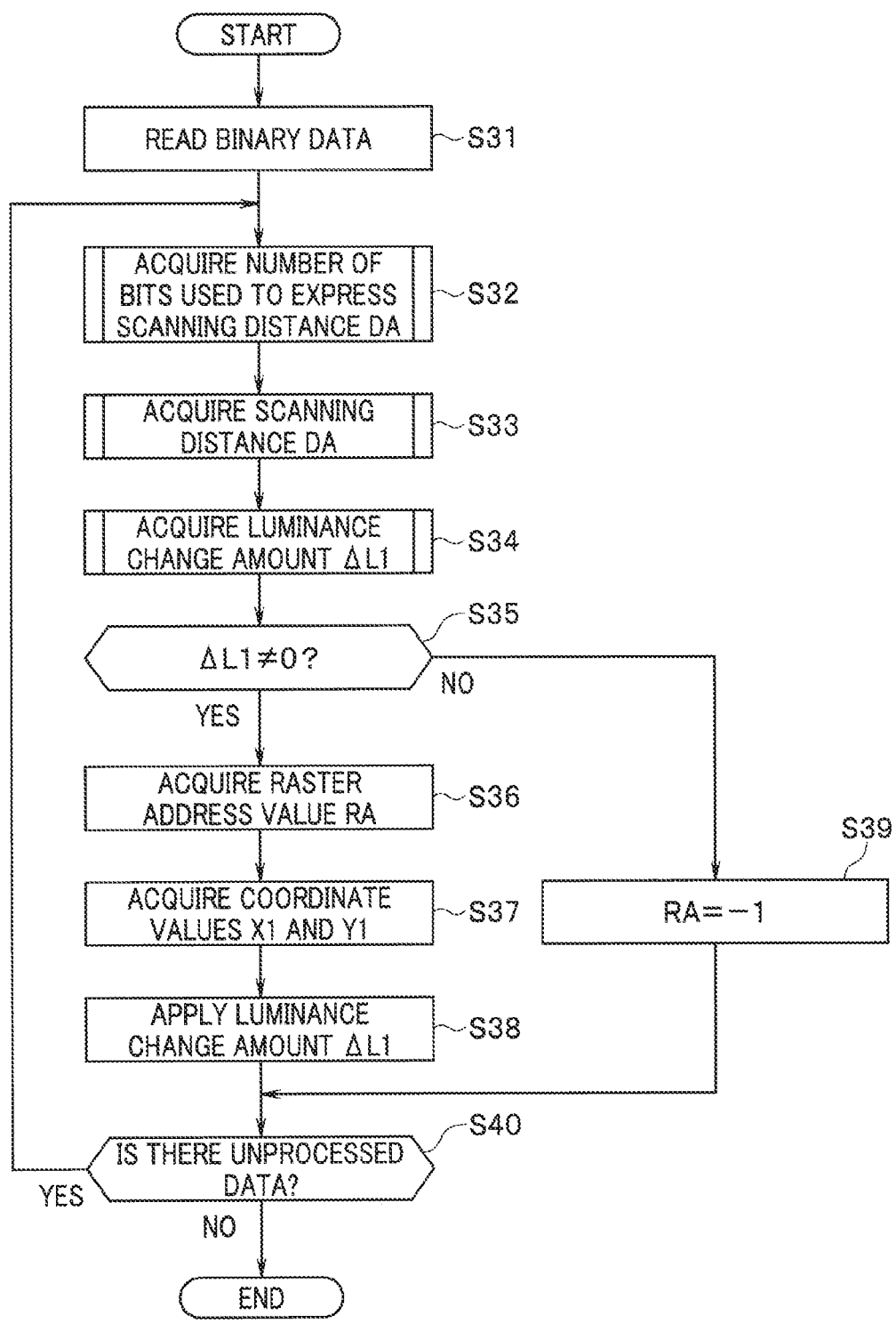
FIG. 5 is a flowchart illustrating a specific example of a process performed in the image processing device according to the embodiment.

Here, a specific example of a process performed by the CPU 26 according to the embodiment will be described with reference to FIG. 5 and the like. FIG. 5 is a flowchart illustrating a specific example of a process performed in the image processing device according to the embodiment.

Note that, hereinafter, the image data is assumed to be stored in the DRAM 25 in the description. Hereinafter, the number of bits N and the number of pixels PW used in the process of the encoder unit 22 are used as existing values in the process of the CPU 26 in the description. Hereinafter, head bits of the binary data are interchanged in the arrangement order of the bits included in the binary data in a process performed on the binary data by the CPU 26 in the description. Hereinafter, a case in which similar data to the data included in the pixel data PD1 is acquired (restored) in a process by the CPU 26 will be described as a main example.

Figure 6:
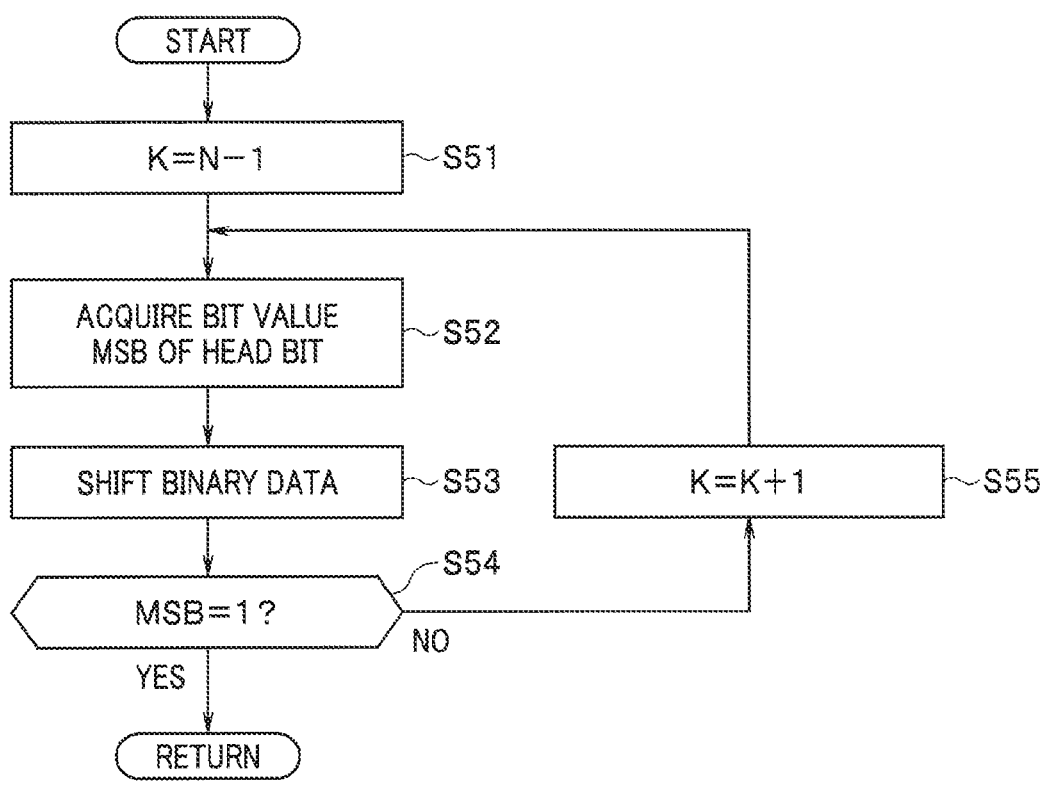
FIG. 6 is a flowchart illustrating a specific example of some of the processes included in the flowchart of FIG. 5.

After the CPU 26 reads the binary data and the image data from the DRAM 25 (step S31 of FIG. 5), the CPU 26 specifies the number of bits K used to express the scanning distance DA, for example, by performing a process illustrated in FIG. 6 and described below (step S32 of FIG. 5). FIG. 6 is a flowchart illustrating a specific example of some of the processes included in the flowchart of FIG. 5.

More specifically, after the CPU 26 sets an initial value of the number of bits K to N−1 (step S51 of FIG. 6), the CPU 26 consecutively performs a process of acquiring a bit value MSB of the head bits of the binary data which is a current processing target (step S52 of FIG. 6), a process of shifting the binary data by one bit (step S53 of FIG. 6), and a process of determining whether the bit value MSB is "1" (step S54 of FIG. 6).

When a determination result of the bit value MSB which is not "1" is obtained (NO in S54), the CPU 26 adds 1 to the value of the current retained number of bits K (step S55 of FIG. 6) and then performs the processes of steps S52 to S54 of FIG. 6 again.

Conversely, when the determination result of the bit value MSB which is "1" is obtained (YES in S54), the CPU 26 specifies the currently retained number of bits K as the number of bits used to express the scanning distance DA.

Figure 7:
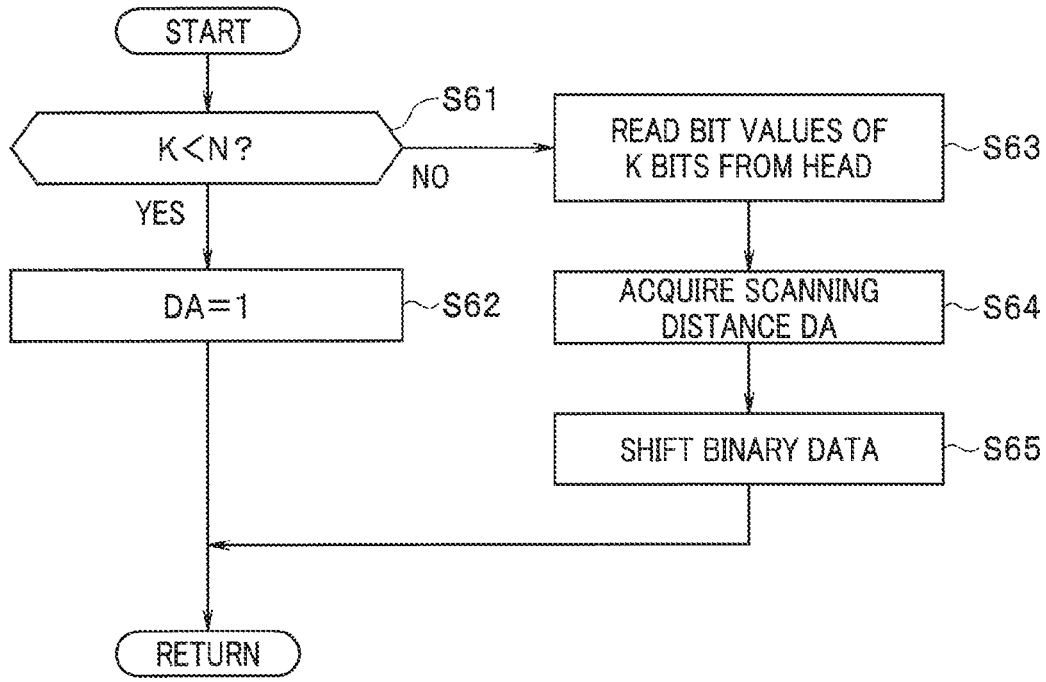
FIG. 7 is a flowchart illustrating a specific example of some of the processes included in the flowchart of FIG. 5.

The CPU 26 acquires the decimal scanning distance DA, for example, by performing a process illustrated in FIG. 7 and described below based on the binary data and the number of bits K obtained through the process of step S32 of FIG. 5 (step S33 of FIG. 5). FIG. 7 is a flowchart illustrating a specific example of some of the processes included in the flowchart of FIG. 5.

More specifically, the CPU 26 performs a process of determining whether the number of bits K obtained through the process of step S32 of FIG. 5 is less than the number of bits N (step S61 of FIG. 7).

Then, when a determination result indicating that the number of bits K obtained through the process of step S32 of FIG. 5 is less than the number of bits N is obtained (YES in S61), the CPU 26 acquires 1 as the decimal scanning distance DA (step S62 of FIG. 7).

Conversely, when a determination result indicating that the number of bits K obtained through the process of step S32 of FIG. 5 is equal to or greater than the number of bits N is obtained (NO in S61), the CPU 26 consecutively performs a process of reading bit values of K bits from the head of the binary data which is a currently processing target (step S63 of FIG. 7), a process of acquiring the decimal scanning distance DA according to the read bit values of the K bits (step S64 of FIG. 7), and a process of shifting the binary data by 1 bit (step S65 of FIG. 7).

Figure 8:
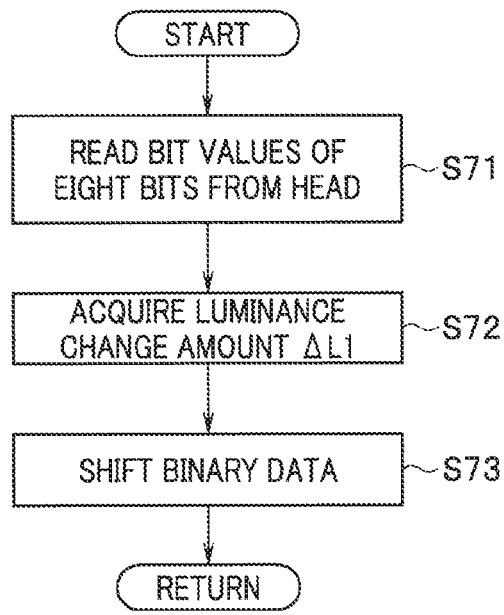
FIG. 8 is a flowchart illustrating a specific example of some of the processes included in the flowchart of FIG. 5.

The CPU 26 acquires the decimal luminance variation amount $\Delta L1$, for example, by performing a process illustrated in FIG. 8 and described below based on the binary data obtained through the process of step S33 of FIG. 5 (step S34 of FIG. 5). FIG. 8 is a flowchart illustrating a specific example of some of the processes included in the flowchart of FIG. 5.

More specifically, the CPU 26 consecutively performs a process of reading bit values of eight bits from the head of the binary data which is a currently processing target (step S71 of FIG. 8), a process of acquiring the decimal luminance variation amount $\Delta L1$ according to the read bit values of the eight bits (step S72 of FIG. 8), and a process of shifting the binary data by one bit (step S73 of FIG. 8).

The CPU 26 determines a process of determining whether the luminance variation amount $\Delta L1$ obtained through the process of step S34 of FIG. 5 is a value different from 0 (step S35 of FIG. 5).

When a determination result indicating that the luminance variation amount $\Delta L1$ obtained through the process of step S34 of FIG. 5 is a value different from 0 is obtained (YES in S35), the CPU 26 continues to perform a process of step S36 of FIG. 5 to be described below. Conversely, when a determination result indicating that the luminance variation amount $\Delta L1$ obtained through the process of step S34 of FIG. 5 is 0 is obtained (NO in S35), the CPU 26 continues to perform a process of step S40 of FIG. 5 to be described below after −1 is acquired as the decimal raster address value RA (step S39 of FIG. 5).

Here, in the embodiment, only when the luminance variation amount $\Delta L \neq 0$, the pixel data is output from the event camera 1 to the image processing device 2.

Therefore, for example, when the luminance variation amount $\Delta L1$ obtained through the process of step S34 of FIG. 5 satisfies the condition of step S35 of FIG. 5, it is specified that the scanning distance DA obtained through the process of step S33 of FIG. 5 and the luminance variation amount $\Delta L1$ are the same values as the data included in the pixel data PD1.

Conversely, for example, when the luminance variation amount $\Delta L1$ obtained through the process of step S34 of FIG. 5 does not satisfy the condition of step S35 of FIG. 5, it is specified that the scanning distance DA obtained through the process of step S33 of FIG. 5 is the value corresponding to the bit value "1" of the head in the escape code generated through the escape process of step S5 of FIG. 3 and the luminance variation amount $\Delta L1$ is a value corresponding to an 8-bit bit string "00000000" located immediately after the bit value "1."

The CPU 26 acquires the binary raster address value RA corresponding to the pixel data PD1 by applying the scanning distance DA obtained through the process of step S33 of FIG. 5 and the raster address value PA corresponding to the pixel data PD0 immediately before the pixel data PD1 to Equation (2) above (step S36 of FIG. 5).

Note that the CPU 26 according to the embodiment is assumed to retain the raster address value RA acquired through the process of step S36 or S39 of FIG. 5 until a subsequent raster address value is acquired.

The CPU 26 acquires the coordinate values X1 and Y corresponding to the pixel data PD1 based on the number of pixels PW and the raster address value RA obtained through the process of step S36 of FIG. 5 (step S37 of FIG. 5).

More specifically, the CPU 26 acquires a quotient value obtained through an operation of removing the raster address value RA using the number of pixels PW as the coordinate value Y1 and acquires a remainder value obtained through this operation as the coordinate value X1.

The CPU 26 specifies the pixel P1 corresponding to the coordinate values X1 and Y1 obtained through the process of step S37 of FIG. 5 among the pixels included in the image data read from the DRAM 25. The CPU 26 continues a process of step S40 of FIG. 5 to be described below after applying the luminance variation amount $\Delta L1$ obtained through the process of step S34 of FIG. 5 to a luminance value of the pixel P1 (step S38 of FIG. 5).

The CPU 26 determines whether there is unprocessed binary data among the binary data read in step S31 of FIG. 5 (step S40 of FIG. 5).

When a determination result indicating that there is the unprocessed data among the binary data read in step S31 of FIG. 5 is obtained (YES in S40), the CPU 26 performs the processes after step S32 of FIG. 5 again using the unprocessed binary data.

When a determination result indicating that there is no unprocessed binary data among the binary data read in step S31 of FIG. 5 is obtained (NO in S40), the CPU 26 ends the series of processes of FIG. 5. Then, for example, when the process of step S40 of FIG. 5 ends and a predetermined time elapses, the CPU 26 performs the series of processes of FIG. 5 again.

As described above, according to the embodiment, the raster address value RA and the scanning distance DA are calculated according to the coordinate values (X, Y) included in the pixel data output from the event camera 1. As described above, according to the embodiment, when the scanning distance DA is 1, the data indicating the scanning distance DA is not output from the encoder unit 22. Therefore, according to the embodiment, it is possible to reduce a data transfer amount to be transferred to the DRAM 25 further than, for example, a case in which data in which the coordinate values (X, Y) output from the event camera 1 are converted simply into binary digits is transferred to the DRAM 25. Accordingly, according to the embodiment, it is possible to reduce the data transfer amount when the data obtained by the event camera is transferred to the main memory.

Note that according to the embodiment, in the event camera 1, the pixels disposed on the sensor surface of the image sensor are scanned in a scanning order different from the raster scanning order. A process according to a modification of the embodiment according to the configuration will be described below. Note that, hereinafter, specific description of a portion in which the above-described operation or the like can be applied will be appropriately omitted.

The event camera 1 acquires pixel data PD8 corresponding to a pixel P8 in which a change in luminance is detected among the pixels included in the image sensor, for example, at a time t8 by scanning the pixels disposed on the sensor surface of the image sensor in the block raster scanning order and outputs the acquired pixel data PD8 to the image processing device 2. The event camera 1 acquires pixel data PD9 corresponding to a pixel P9 in which a change in luminance is detected among the pixels included in the image sensor, for example, at a time t9 subsequent to the time t8 by scanning the pixels disposed on the sensor surface of the image sensor in the block raster scanning order and outputs the acquired pixel data PD9 to the image processing device 2. For example, the pixel data PD8 and the pixel data PD9 are included in the pixel data acquired in a scanning method illustrated in FIG. 9 to be described below.

Figure 9:
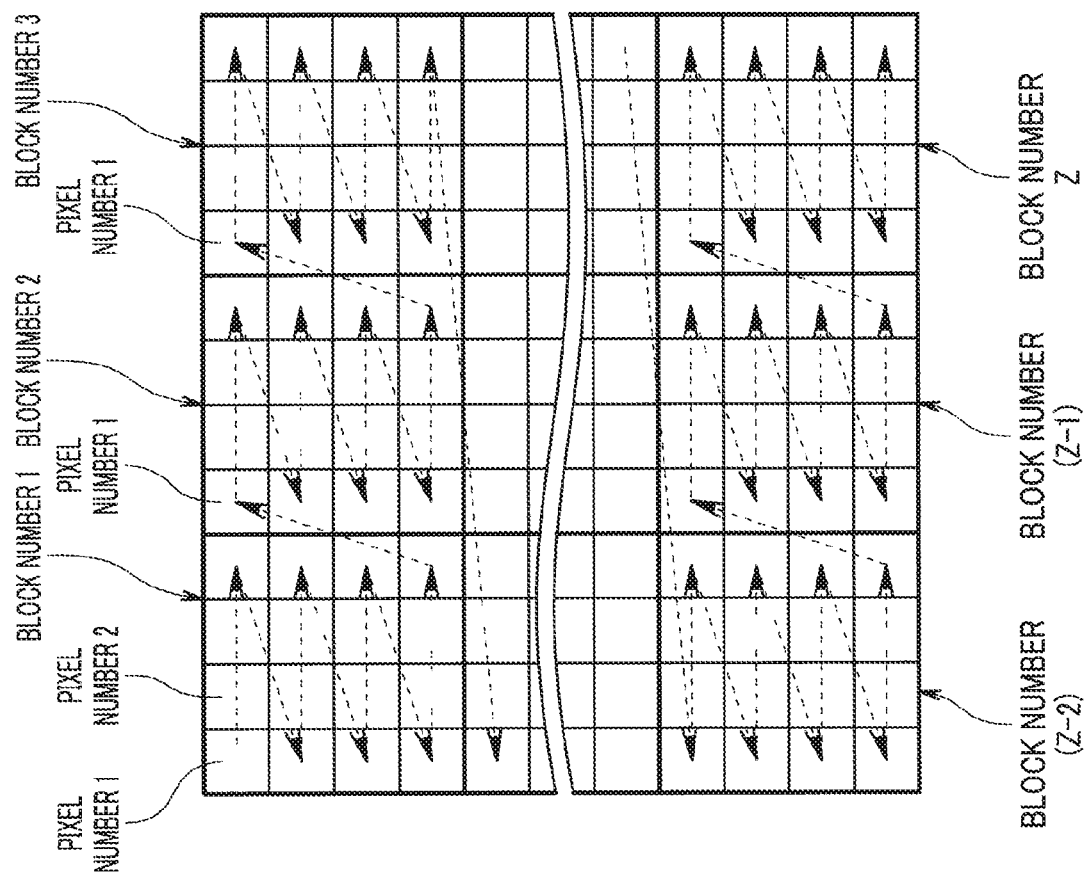
FIG. 9 is a diagram illustrating an example when pixels disposed on a sensor surface of an image sensor are scanned in a block raster scanning order.

The above-described block raster scanning order is expressed as, for example, a scanning order in which a sequence when Z blocks are scanned and a sequence when $2^c \times 2^c$ pixels included one block among Z blocks are scanned are set in the raster scanning order in a state in which the pixels disposed on the sensor surface of the image sensor in the event camera 1 are partitioned into Z (where Z≥2) rectangular blocks that have a size of $2^c \times 2^c$. Therefore, in the above-described block raster scanning order, the pixels disposed on the sensor surface of the image sensor in the event camera 1 are scanned in, for example, a sequence illustrated in FIG. 9. Note that, in the above-described block raster scanning order, as illustrated in FIG. 9, block numbers are assumed to be assigned in advance to the blocks according to the sequence when the Z blocks are scanned. In the above-described block raster scanning order, as illustrated in FIG. 9, pixel numbers are assumed to be assigned in advance to the pixels according to the sequence when the $2^c \times 2^c$ pixels included on one block among the Z blocks are scanned. FIG. 9 is a diagram illustrating an example when the pixels disposed on the sensor surface of the image sensor in the event camera are scanned in the block raster scanning order.

The pixel data PD8 includes a block number B8 with which a position of one block to which the pixel P8 (where 1≤B8≤Z) belongs can be specified in the Z blocks, a pixel number I8 (where 1≤I8≤$2^c \times 2^c$) with which the position of the pixel P8 in the one block can be specified, and a luminance change amount ΔL8 equivalent to information indicating magnitude of a change in luminance occurring in the pixel P8. The pixel data PD9 includes a block number B9 (where 1≤B9≤Z) with which a position of one block to which the pixel P9 belongs can be specified in the Z blocks, a pixel number I9 (where 1≤I9≤$2^c \times 2^c$) with which the position of the pixel P9 in the one block can be specified, and a luminance change amount ΔL9 equivalent to information indicating magnitude of a change in luminance occurring in the pixel P9.

In other words, in the modification, the block number B8 and the pixel number I8 are acquired as two-dimensional address values indicating a pixel position of the pixel P8 at which the change in luminance is detected in an object. In the modification, the block number B9 and the pixel number I9 are acquired as two-dimensional address values indicating a pixel position of the pixel P9 at which the change in luminance is detected in an object.

The encoder unit 22 performs a process of acquiring the block raster address value SAS equivalent to a one-dimensional address value indicating the position of the pixel P8 by applying the block number B8 and the pixel number I8 included in the pixel data PD8 to Equation (4) below as a process of replacing step S1 of FIG. 3. The encoder unit 22 performs a process of acquiring the block raster address value SA9 equivalent to a one-dimensional address value indicating the position of the pixel P9 by applying the block number B9 and the pixel number I9 included in the pixel data PD9 to Equation (5) below as a process of replacing step S1 of FIG. 3.

$$SA8 = \{(B8-1) \times 2^c \times 2^c\} + I8 \quad (4)$$

$$SA9 = \{(B9-1) \times 2^c \times 2^c\} + I9 \quad (5)$$

The encoder unit 22 performs a process of calculating the scanning distance DB by applying the block raster address values SA8 and SA9 calculated in step S1 of FIG. 3 to Equation (6) below as a process of replacing step S2 of FIG. 3.

$$DB = SA9 - SA8 \quad (6)$$

The scanning distance DB calculated using Equation (6) above indicates a distance when a section from the first pixel in which the change in luminance is detected at the first timing among the pixels included in the image sensor of the event camera 1 to the second pixel in which the change in luminance is detected at the second timing later than the first timing is traced by one pixel in the block raster scanning order.

The encoder unit 22 performs similar processes to the processes after step S3 of FIG. 3 using the scanning distance DB calculated with Equation (6) above instead of the scanning distance DA.

In the process according to the modification, for example, when a size of an object of which luminance is changed is a size which is within one block among the Z blocks, the additional number of bits T set through the process of step S7 of FIG. 3 can be set to 0. Therefore, in the process according to the modification, by appropriately setting a size of each block and the number of blocks scanned in the block raster scanning order, it is possible to further reduce a data transfer amount which is transferred to the DRAM 25 more than when the scanning distance DA calculated with Equation (2) above is used to perform the process.

Having described the preferred embodiments of the invention referring to the accompanying drawings, it should be understood that the present invention is not limited to those precise embodiments. The novel embodiments can be realized in various forms, and various omissions, substitutions and changes can be made within the scope of the invention without departing from the gist of the invention. The embodiments and modifications thereof are included in the scope or the gist of the invention and are included in an equal range to the range of the invention defined in the appended claims.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image processing device that is used in combination with a camera configured to acquire pixel data including a luminance change amount and a two-dimensional address value indicating a pixel position on a sensor surface for each pixel of which a change in luminance in an object is detected by scanning a plurality of pixels disposed in a lattice form on the sensor surface of an image sensor in a predetermined scanning order, the image processing device comprising:

an address value acquisition unit configured to acquire a one-dimensional address value by applying a predetermined conversion process set based on the predetermined scanning order and a number of pixels on the sensor surface to the two-dimensional address value included in the pixel data;

a scanning distance calculation unit configured to calculate a scanning distance from a first pixel in which a change in luminance is detected at a first timing among the plurality of pixels to a second pixel in which a change in luminance is detected at a second timing later than the first timing based on the one-dimensional address value acquired by the address value acquisition unit; and a binary data generation unit configured to generate and output binary data including bit strings that have different numbers of bits in accordance with a calculation result of the scanning distance by the scanning distance calculation unit and a bit string indicating the luminance change amount.

2. The image processing device according to claim 1, wherein
the scanning distance calculation unit calculates the scanning distance by performing a first calculation that subtracts a first address value equivalent to the one-dimensional address value obtained by applying the predetermined conversion process to the two-dimensional address value included in first pixel data corresponding to the first pixel from a second address value equivalent to the one-dimensional address value obtained by applying the predetermined conversion process to the two-dimensional address value included in second pixel data corresponding to the second pixel.

3. The image processing device according to claim 2, wherein
the scanning distance calculation unit recalculates the scanning distance by performing a second calculation that adds 1 to the second address value when a calculation result of the scanning distance obtained by performing the first calculation is a value equal to or less than 0.

4. The image processing device according to claim 3, wherein
the binary data generation unit generates data in which a bit value "1" indicating a header and a bit string having a predetermined number of bits indicating the luminance change amount are sequentially arranged, as the binary data corresponding to the second pixel data, when the calculation result of the scanning distance obtained by performing the first calculation or the second calculation is 1.

5. The image processing device according to claim 3, wherein
the binary data generation unit sets, depending on whether the scanning distance is expressed as binary digits of N bits, an additional number of bits T added to the N bits and generates a header in which consecutive T bit values "0" and a 2-bit bit string "01" are sequentially arranged when the calculation result of the scanning distance obtained by performing the first calculation or the second calculation is greater than 1.

6. The image processing device according to claim 5, wherein
the binary data generation unit generates data in which a (T+2)-bit bit string indicating the header, an (N+T)-bit bit string indicating the scanning distance and a bit string having a predetermined number of bits indicating the luminance change amount are sequentially arranged, as the binary data corresponding to the second pixel data.

7. The image processing device according to claim 1, wherein
the predetermined scanning order is a raster scanning order.

8. The image processing device according to claim 1, wherein
the predetermined scanning order is a block raster scanning order.

* * * * *